UNITED STATES PATENT OFFICE.

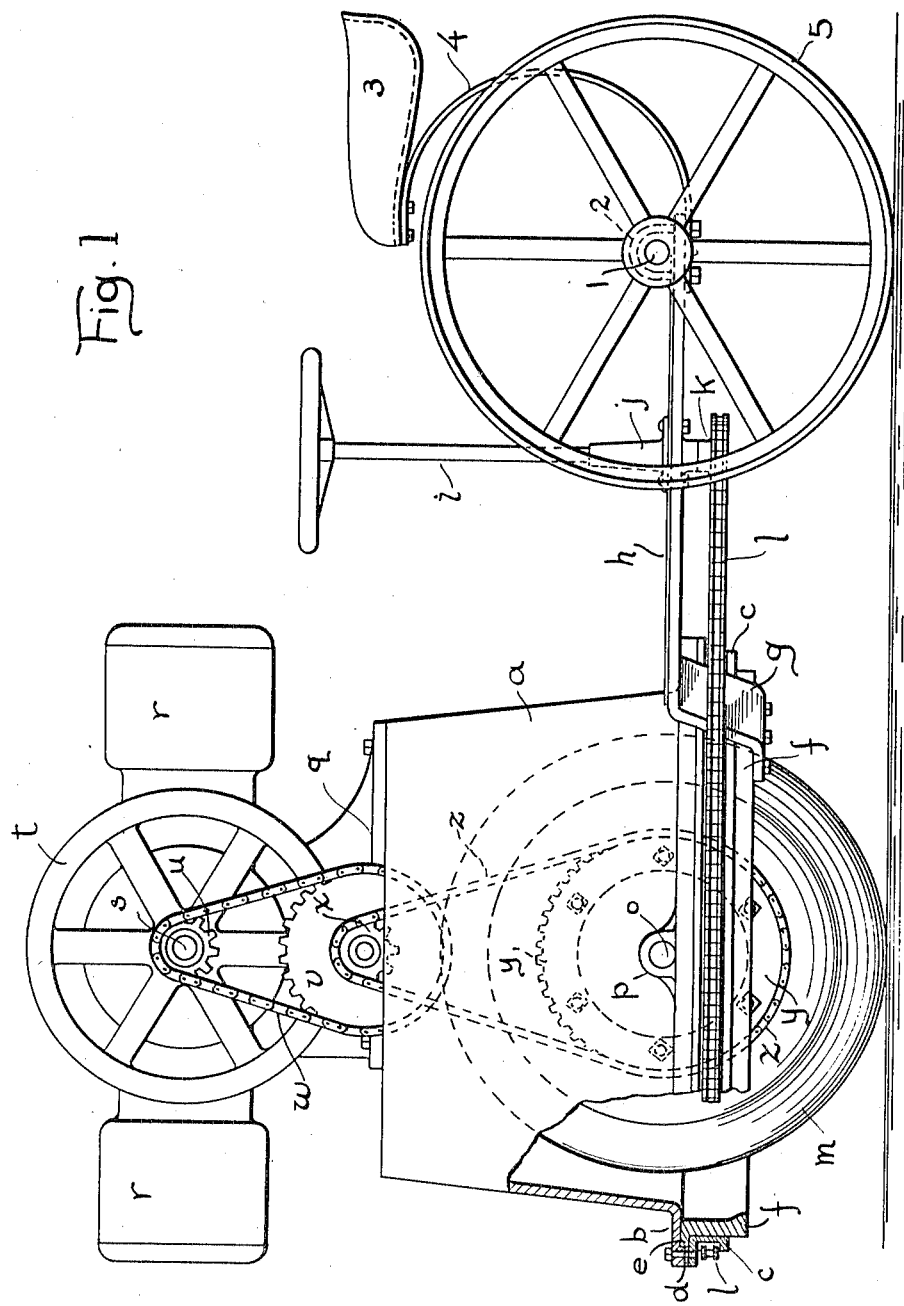

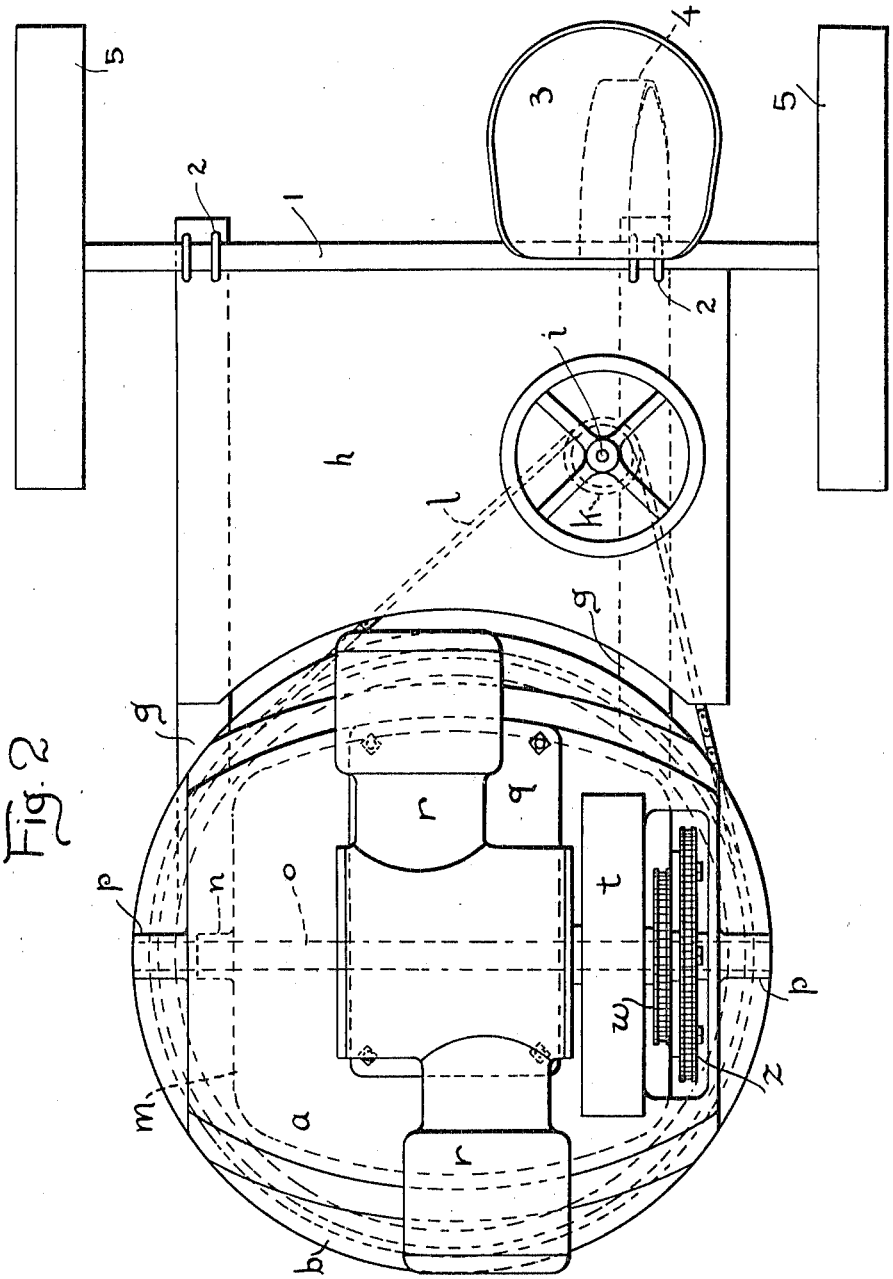

RANSOM E. OLDS, OF LANSING, MICHIGAN.

TRACTOR.

1,105,686.   Specification of Letters Patent.   Patented Aug. 4, 1914.

Application filed December 13, 1913.   Serial No. 806,379.

*To all whom it may concern:*

Be it known that I, RANSOM E. OLDS, a citizen of the United States, residing at Lansing, county of Ingham, State of Michigan, have invented a certain new and useful Improvement in Tractors, and declare the following to be a full, clear, and exact description of the same, such as will enable others skilled in the art to which it pertains to make and use the same, reference being had to the accompanying drawings, which form a part of this specification.

This invention relates to tractors. It is adapted to travel over rough and uneven ground and it is so designed it can be turned around in its own length.

In the drawings: Figure 1, is a side elevation with a part of the front of the tractor broken away. Fig. 2, is a top plan view.

The tractor is made up essentially of two units, the front unit and a rear unit. The front unit comprises a platform $a$ in the form of an inverted receptacle or housing. The lower end of the platform is turned out to form an angular flange $b$. This flange abruptly thickens at its exterior edge and through this thickened portion bolts are passed which hold the ring $c$. This ring $c$ protrudes inwardly beyond the abruptly thickened portion of the flange and forms with the flange a groove $d$ adapted to receive the annular flange $e$ of the circular track $f$. The flange $e$ fits into the groove $d$ loosely so that the platform and depending ring may turn with respect to the track $f$. This arrangement of parts makes in reality a turn-table, the track of which is a part of the rear unit of the tractor connected therewith by being bolted to the Z-bar hanger portions $g$ which are a part of the casting that forms the floor $h$ of the tractor.

A steering column $i$ is journaled in a suitable sleeve $j$ that is bolted to the floor of the tractor and it carries on its lower end a pinion $k$, the teeth of which engage with a chain $l$. This chain $l$ extends around the outside of the ring $c$ which is grooved to retain it, hence by turning the steering column, the chain is moved and this pulls the ring about on the circular track and thereby moves the front unit including the platform $a$.

Within the platform $a$ is located a bilged roller $m$ provided with a hollow trunnion $n$. A shaft $o$ runs through the axis of the roller and through the trunnions. This shaft is journaled at each end in the bearing brackets $p$ raised on the upper surface of the annular flange $b$. The bilged roller, like a bilged barrel may be turned with little effort as it has a small area of contact with the ground. However, enough surface is provided by the complete peripheral area of the roller so that when soft soil is met the roller will not sink. It is a difficult matter to turn a heavy structure like a tractor in soft ground but I obviate this difficulty by the bilged construction of my roller which makes it possible to turn the front unit by hand power.

On the top of the platform $a$ is located an engine base $q$ that is bolted to the platform. A pair of opposing engine cylinders $r$ are shown. This internal combustion engine drives the shaft $s$, which carries the fly wheel. Upon the end of the shaft is a spur gear $u$ whose teeth engage with the links of a chain $w$. This chain $w$ runs over a larger gear wheel $v$ and to this larger gear wheel is fastened another small spur gear $x$. To the end of the roller $m$ is bolted the larger gear wheel $y$. The chain $z$ passes from the teeth of the small spur gear $x$ to the teeth of the larger gear wheel $y$. This line of power transmission from the engine shaft to the roller considerably reduces the speed of rotation. It will be understood that any appropriate reduction gearing could be used. The engine, the transmission line, and the roller are all connected with the platform $a$ and form the front unit. The roller supports the platform and platform supports the track $f$.

The floor $h$ of the tractor may be attached to the rear axle 1 by any simple means such as clips 2. A seat 3 is supported in the familiar way by a C-spring 4. The wheels 5 rotate on the ends of the axle 1.

The turn-table fashion of journaling the front and rear units together permits of the turning of the tractor within its own length which is an advantage in taking the corners of a field in which the tractor is working.

What I claim is:

A tractor, having in combination, a platform having a circular base with an inverted receptacle or a housing, rising therefrom, a long bilged roller extending approximately from side to side of said base and journaled in the said platform, the upper part of said platform serving to bridge said roller, a power unit mounted on the top and outside of the said platform, transmission means between the power unit and the roller below, a rear unit connected with the said circular base of the platform in turn-table fashion, and steering means mounted upon the rear unit and connecting with the platform to turn the platform with respect to the rear unit when actuated.

In testimony whereof, I sign this specification in the presence of two witnesses.

RANSOM E. OLDS.

Witnesses:
EMORY W. OLDS,
JAS. H. THOMPSON.